US012735994B2

(12) United States Patent
Alvanos et al.

(10) Patent No.: US 12,735,994 B2
(45) Date of Patent: Sep. 15, 2026

(54) FAN EXIT GUIDE VANE LOAD CARRYING TENSION MEMBER WITH DAMPER

(71) Applicant: RTX Corporation, Farmington, CT (US)

(72) Inventors: Ioannis Alvanos, West Springfield, MA (US); Michael W. Trudnak, Mansfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/818,892

(22) Filed: Aug. 29, 2024

(65) Prior Publication Data

US 2026/0063049 A1 Mar. 5, 2026

(51) Int. Cl.
*F01D 25/04* (2006.01)
*F01D 9/04* (2006.01)

(52) U.S. Cl.
CPC ............ *F01D 25/04* (2013.01); *F01D 9/042* (2013.01); *F05D 2220/36* (2013.01); *F05D 2260/96* (2013.01)

(58) Field of Classification Search
CPC ........ F01D 25/04; F01D 17/162; F01D 9/041; F01D 9/065; F01D 5/16; F01D 5/26; F05D 2260/96
See application file for complete search history.

(56) References Cited

U.S. PATENT DOCUMENTS

| | | | | |
|---|---|---|---|---|
| 5,056,738 A * | 10/1991 | Mercer | F04D 29/668 D12/345 |
| 5,074,752 A | 12/1991 | Murphy et al. | |
| 5,284,011 A * | 2/1994 | Von Benken | F01D 9/041 415/119 |

(Continued)

FOREIGN PATENT DOCUMENTS

| | | |
|---|---|---|
| EP | 3643880 A2 | 4/2020 |
| EP | 3708777 A1 | 9/2020 |
| EP | 3936702 A1 | 9/2020 |

OTHER PUBLICATIONS

Extended European Search Report for counterpart EP Application No. 25195758.5 mailed Nov. 4, 2025.

*Primary Examiner* — Justin D Seabe
(74) *Attorney, Agent, or Firm* — Bachman & LaPointe, P.C.

(57) ABSTRACT

A fan exit guide vane load member with a damper including a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane; a load member cavity formed within the fan exit guide vane extending spanwise through the fan exit guide vane from the radially inner attachment region to the radially outer attachment region; and the load member (Continued)

extending through the load member cavity beyond each of the radially inner attachment region and the radially outer attachment region of the fan exit guide vane; and the damper in operative communication with the load member.

15 Claims, 5 Drawing Sheets

(56) References Cited

U.S. PATENT DOCUMENTS

| | | | | |
|---|---|---|---|---|
| 5,356,264 | A * | 10/1994 | Watson ................... | F01D 25/04<br>416/500 |
| 9,200,536 | B2 * | 12/2015 | McCaffrey ............ | F01D 25/246 |
| 10,436,050 | B2 | 10/2019 | Filipenco et al. | |
| 11,415,009 | B2 | 8/2022 | Sobanski et al. | |
| 11,566,564 | B2 | 1/2023 | Bifulco et al. | |
| 11,634,991 | B1 * | 4/2023 | Snider ....................... | F01D 5/16<br>415/1 |
| 12,071,855 | B2 * | 8/2024 | Kowiel ................... | F01D 9/065 |
| 2012/0039710 | A1 * | 2/2012 | Mathieu .................... | F01D 5/14<br>415/213.1 |
| 2016/0333710 | A1 | 11/2016 | Klinetob et al. | |

* cited by examiner

FAN EXIT GUIDE VANE LOAD CARRYING TENSION MEMBER WITH DAMPER

BACKGROUND

The present disclosure is directed to the improved fan exit guide vane load carrying member with damper.

Current gas turbine engine design, as seen in FIG. 1 through FIG. 4*a*, includes a design with variable or non-variable fan exit guide vanes (FEGV). The fan F is positioned within the fan duct FD proximate the engine inlet EI. The fan exit guide vanes (FEGV) are downstream from the fan F and located forward of the bypass duct BD.

A current FEGV pattern is created to minimize airflow back pressure adverse effect on fan blades F caused by the downstream presence of nacelle N bypass duct BD elements (FIG. 2), such as the upper and lower bifurcation BiFi, air-to-oil cooler cowl AOC, and environmental control system inlet ECS.

As seen in FIG. 3, the FEGV has a circumferential pattern CP made up of vanes V that can translate the structural load path LP shown as arrows in FIG. 4. But all vane types are designed with the same cross sectional monolithic load carrying features (FIG. 4*a*). Additionally, the FEGV pattern aims to optimize the fan duct performance and acoustic characteristics of the gas turbine engine.

The FEGV pattern is defined to meet structural, performance and acoustic requirements across a wide range of operating conditions. It is therefore not optimized at any mission single condition, like cruise condition and climb condition.

SUMMARY

In accordance with the present disclosure, there is provided a fan exit guide vane load member with a damper comprising a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane; a load member cavity formed within the fan exit guide vane extending spanwise through the fan exit guide vane from the radially inner attachment region to the radially outer attachment region; the load member extending through the load member cavity beyond each of the radially inner attachment region and the radially outer attachment region of the fan exit guide vane; and the damper in operative communication with the load member.

A further embodiment of any of the foregoing embodiments may additionally and/or alternatively include the damper is configured integral with the load member.

A further embodiment of any of the foregoing embodiments may additionally and/or alternatively include the damper is attached to the load member.

A further embodiment of any of the foregoing embodiments may additionally and/or alternatively include the damper being configured to change the mode of excitement integral to the fan exit guide vane.

A further embodiment of any of the foregoing embodiments may additionally and/or alternatively include the damper is located along any portion of the load member span between the radially inner attachment region and the radially outer attachment region.

A further embodiment of any of the foregoing embodiments may additionally and/or alternatively include the damper is located proximate a load member central portion.

A further embodiment of any of the foregoing embodiments may additionally and/or alternatively include the damper contacts an inner surface of the load member cavity.

In accordance with the present disclosure, there is provided a gas turbine engine with a fan exit guide vane load member with a damper comprising a fan located within a fan duct; an array of fan exit guide vanes supported within the fan duct downstream from the fan, the array of fan exit guide vanes span across the fan duct attached to a radially inner surface of the fan duct and a radially outer surface of the fan duct; each of the fan exit guide vanes comprising a leading edge and a trailing edge opposite chordwise from the leading edge; a radially inner attachment region opposite spanwise from a radially outer attachment region, the radially inner attachment region in operative communication with the radially inner surface of the fan duct, the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane; a load member cavity formed within at least one fan exit guide vane in the array, the load member cavity extending spanwise through the at least one fan exit guide vane from the radially inner attachment region to the radially outer attachment region; the load member extending through the load member cavity beyond each of the radially inner attachment region and the radially outer attachment region of the at least one fan exit guide vane; the load member in operative communication with the radially inner surface and the radially outer surface; and the damper in operative communication with the load member.

A further embodiment of any of the foregoing embodiments may additionally and/or alternatively include the damper contacts the load member on only a side and contacts the load member cavity on only a side.

A further embodiment of any of the foregoing embodiments may additionally and/or alternatively include the damper is located along a load member span at a predetermined distance farthest from with the radially inner surface and the radially outer surface.

A further embodiment of any of the foregoing embodiments may additionally and/or alternatively include the load member being configured oriented as angled from a radial orientation relative to the gas turbine engine axis.

A further embodiment of any of the foregoing embodiments may additionally and/or alternatively include the damper is located along any portion of a load member span between the radially inner attachment region and the radially outer attachment region.

A further embodiment of any of the foregoing embodiments may additionally and/or alternatively include the damper contacts an inner surface of the load member cavity.

A further embodiment of any of the foregoing embodiments may additionally and/or alternatively include the damper is located proximate a load member central portion.

In accordance with the present disclosure, there is provided a process for supporting a structural load path in a gas turbine engine with a fan exit guide vane having a load member with a damper comprising locating a fan within a fan duct; supporting an array of fan exit guide vanes within the fan duct downstream from the fan; attaching the array of fan exit guide vanes spanned across the fan duct to a radially inner surface of the fan duct and a radially outer surface of the fan duct; each of the fan exit guide vanes comprising a leading edge and a trailing edge opposite chordwise from the leading edge; a radially inner attachment region opposite spanwise from a radially outer attachment region; coupling the radially inner attachment region in operative communication with the radially inner surface of the fan duct; coupling the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane; forming a load member cavity within at least one fan exit guide vane in the array; extending the load member cavity spanwise through the at least one fan exit guide vane from the radially inner attachment region to the radially outer attachment region; extending the load member through the load member cavity beyond each of the radially inner attachment region and the radially outer attachment region of the at least one fan exit guide vane; coupling the load member in operative communication with the radially inner surface and the radially outer surface; and coupling the damper in operative communication with the load member.

A further embodiment of any of the foregoing embodiments may additionally and/or alternatively include the process further comprising configuring the damper integral with the load member.

A further embodiment of any of the foregoing embodiments may additionally and/or alternatively include the process further comprising configuring the damper to change the mode of excitement integral to the fan exit guide vane.

A further embodiment of any of the foregoing embodiments may additionally and/or alternatively include the process further comprising locating the damper along any portion of a load member span between the radially inner attachment region and the radially outer attachment region.

A further embodiment of any of the foregoing embodiments may additionally and/or alternatively include the process further comprising contacting an inner surface of the load member cavity with the damper.

A further embodiment of any of the foregoing embodiments may additionally and/or alternatively include the process further comprising locating the damper proximate a load member central portion.

A further embodiment of any of the foregoing embodiments may additionally and/or alternatively include the process further comprising contacting the load member with the damper on at least one side; and contacting the load member cavity with the damper on at least one side.

Other details of the fan exit guide vane load carrying member with damper are set forth in the following detailed description and the accompanying drawings wherein like reference numerals depict like elements.

DETAILED DESCRIPTION

Figure 1:
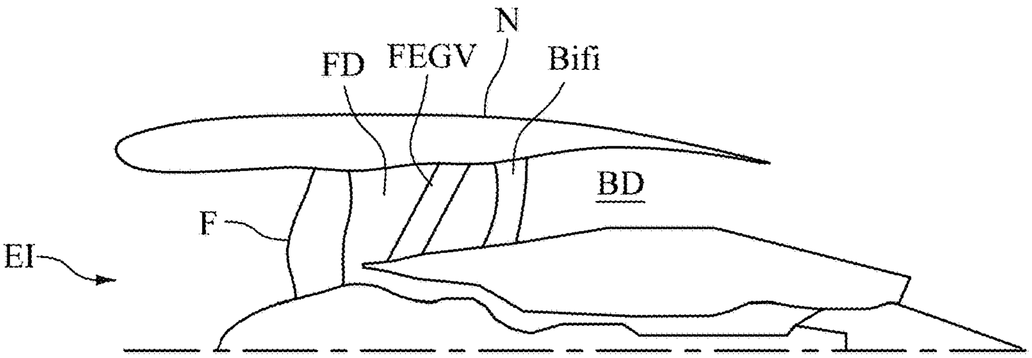
FIG. 1 (PRIOR ART)
FIG. 1 is a schematic representation of a prior art gas turbine engine.
Figure 2:
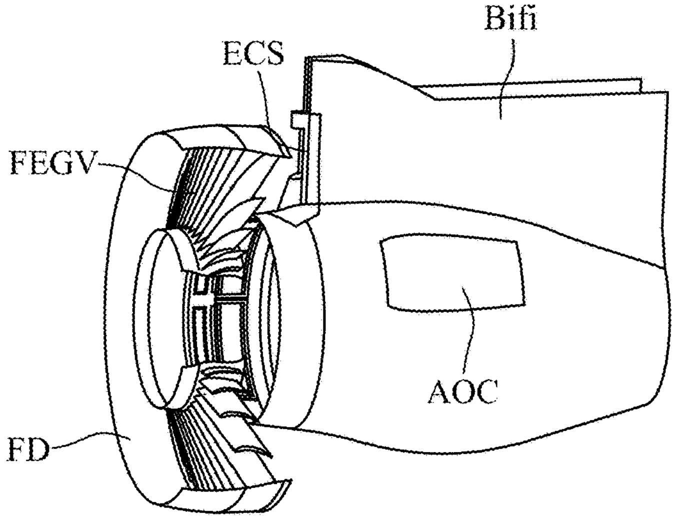
FIG. 2 (PRIOR ART)
FIG. 2 is a schematic representation of a prior art gas turbine engine.
Figure 3:
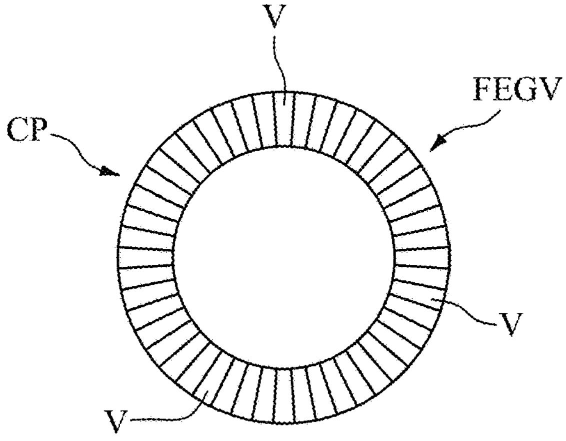
FIG. 3 (PRIOR ART)
FIG. 3 is a schematic representation of a prior art fan exit guide vane pattern.
Figure 4:
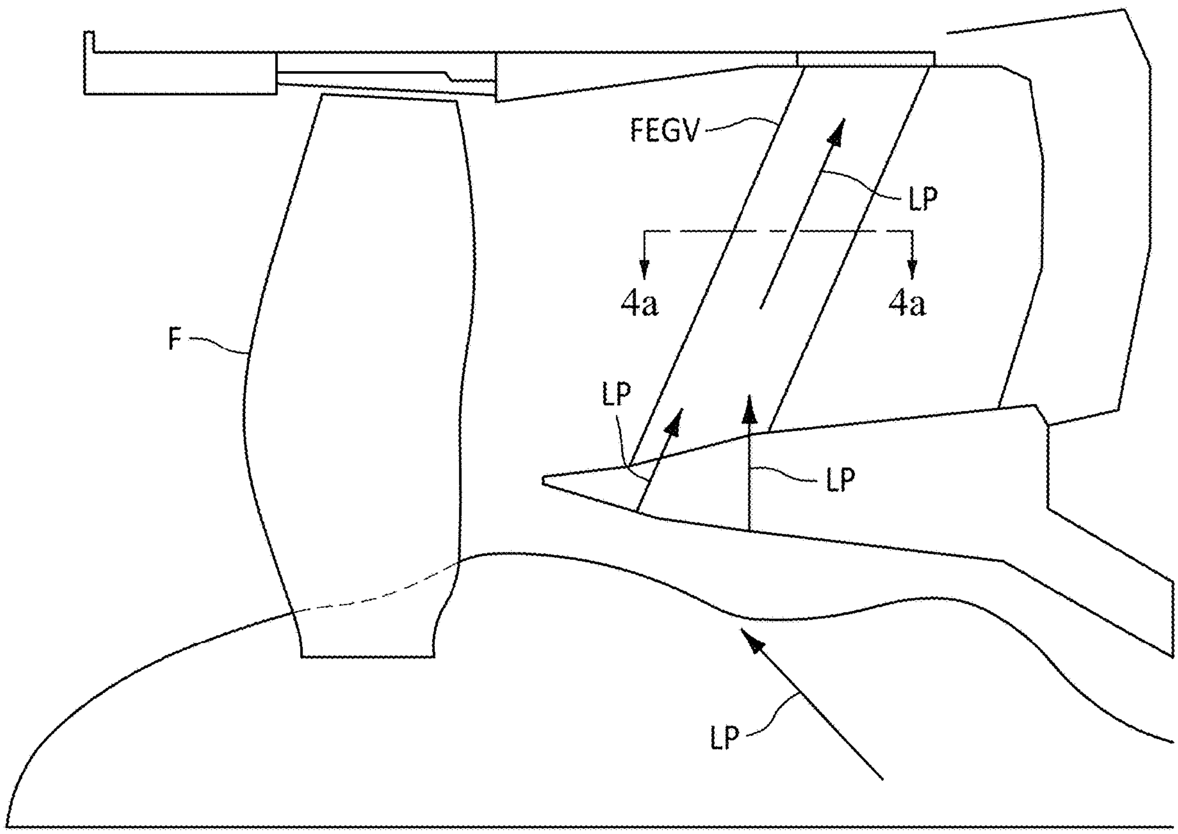
FIG. 4 (PRIOR ART)
FIG. 4 is a schematic representation of a prior art fan exit guide vane with load path.
Figure 4A:
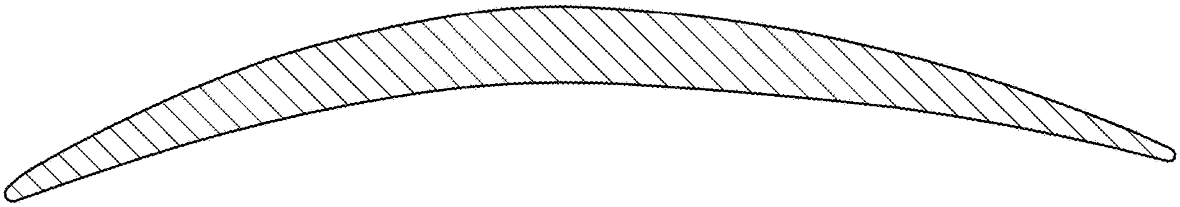
FIG. 4a (PRIOR ART)
FIG. 4A is a sectional view schematic representation of the prior art fan exit guide vane FIG. 4.
Figure 5:
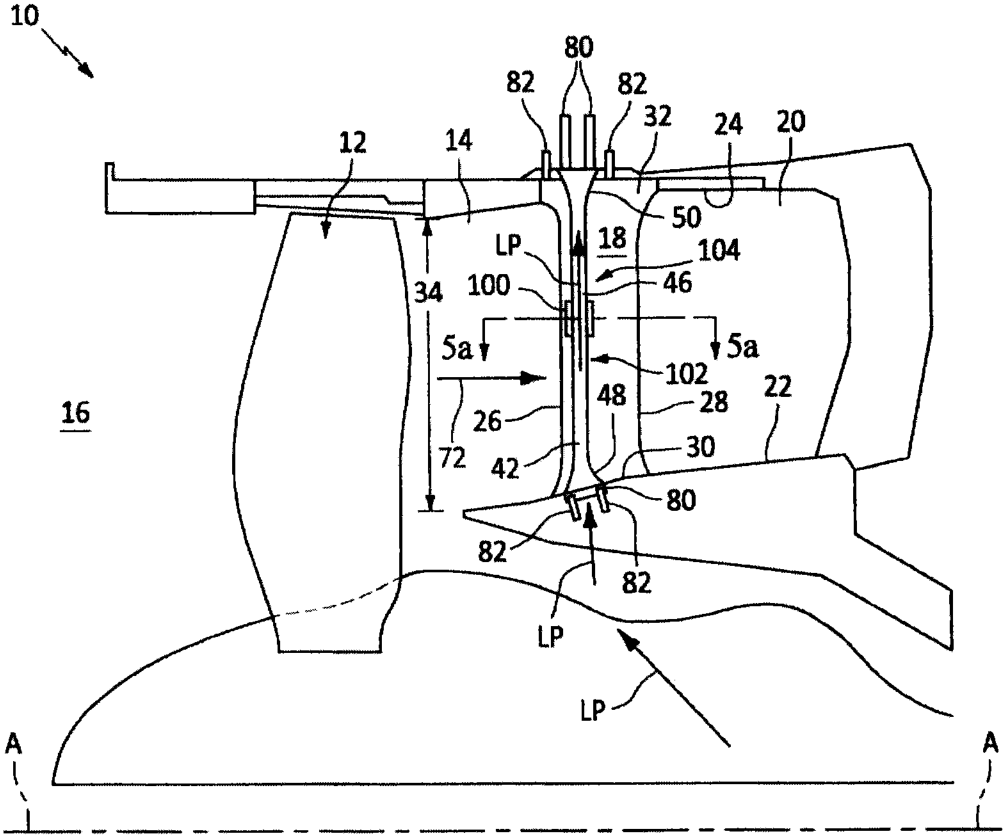
FIG. 5 is a schematic representation of an exemplary fan exit guide vane with load carrying member.

Referring now to FIG. 5 showing a schematic of a gas turbine engine 10. The gas turbine engine 10 includes a fan 12 within a fan duct 14 proximate an engine inlet 16. Downstream from the fan 12 is a fan exit guide vane 18 upstream from a bypass duct 20. There can be an array 62 of fan exit guide vanes 18 arranged circumferentially around the fan duct 20, (see FIGS. 8*a*-8*d*). The fan exit guide vane 18 can support a structural load path LP shown as arrows.

The fan exit guide vane 18 spans across the fan duct 14 attached to a radially inner surface 22 of the fan duct 14 and a radially outer surface 24 of the fan duct 14.

Figure 5A:
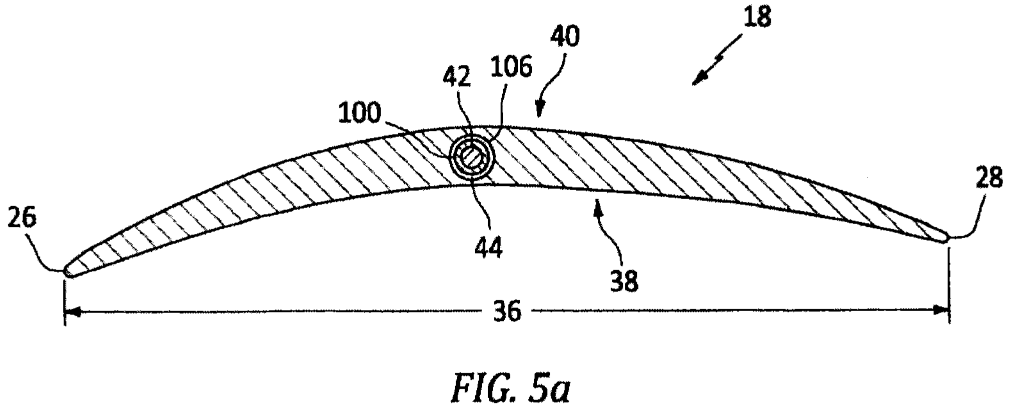
FIG. 5*a* is a sectional view schematic representation of the exemplary fan exit guide vane with load carrying member of FIG. 5.

With reference also to FIG. 5*a*, the fan exit guide vane 18 includes a leading edge 26 and a trailing edge 28 opposite chordwise from the leading edge 26. The fan exit guide vane 18 shown in FIG. 5 is oriented generally vertical, that is along a similar radial span between the radially inner surface 22 and radially outer surface 24 relative to the axis A.

The fan exit guide vane 18 includes a radially inner attachment region 30 proximate the radially inner surface 22. The fan exit guide vane 18 includes a radially outer attachment region 32 proximate the radially outer surface 24. The radially inner attachment region 30 is opposite spanwise from the radially outer attachment region 32. The radially inner attachment region 30 of the fan exit guide vane 18 attaches to the fan duct 14 at the radially inner surface 22. The radially outer attachment region 32 of the fan exit guide vane 18 attaches to the fan duct 14 at the radially outer surface 24.

The fan exit guide vane 18 includes a span 34 dimension extending between the radially inner attachment region 30 and the radially outer attachment region 32. The fan exit guide vane 18 includes a chord dimension 36 extending between the leading edge 26 and the trailing edge 28, as seen in FIG. 5*a*. The fan exit guide vane 18 includes a pressure side 38 opposite a suction side 40, as seen in FIG. 6A.

The fan exit guide vane 18 includes a load member 42. The load member 42 extends through a load member cavity 44 extending spanwise through the fan exit guide vane 18. The load member cavity 44 is formed with sufficient size to allow for contact free placement of the load member 42 through the fan exit guide vane 18, as seen in FIG. 5. The load member 42 can extend through the load member cavity 44 past each of the radially inner attachment region 30 and radially outer attachment region 32 of the fan exit guide vane 18.

The load member 42 can include a body 46 with a first end 48 and a second end 50 opposite the first end 48, as seen in FIG. 5. The load member 42 can provide the structural load characteristics needed to support the components within the gas turbine engine 10 in substitute for the fan exit guide vane 18 structure. The load member 42 completes the load path LP of the gas turbine engine 10 that the fan exit guide vane 18 traditionally carried. The load member 42 supports a load in tension along the span dimension 34 of the fan exit guide vane 18 between the radially inner surface 22 and radially outer surface 24. The fan exit guide vane 18 maintains the aerodynamic loads presented within the fan duct 14. The aerodynamic loads are created by the fan exhaust flowing over the pressure side 38 and suction side 40 and other control surfaces of the fan exit guide vane 18, as seen in FIG. 5.

Figure 6:
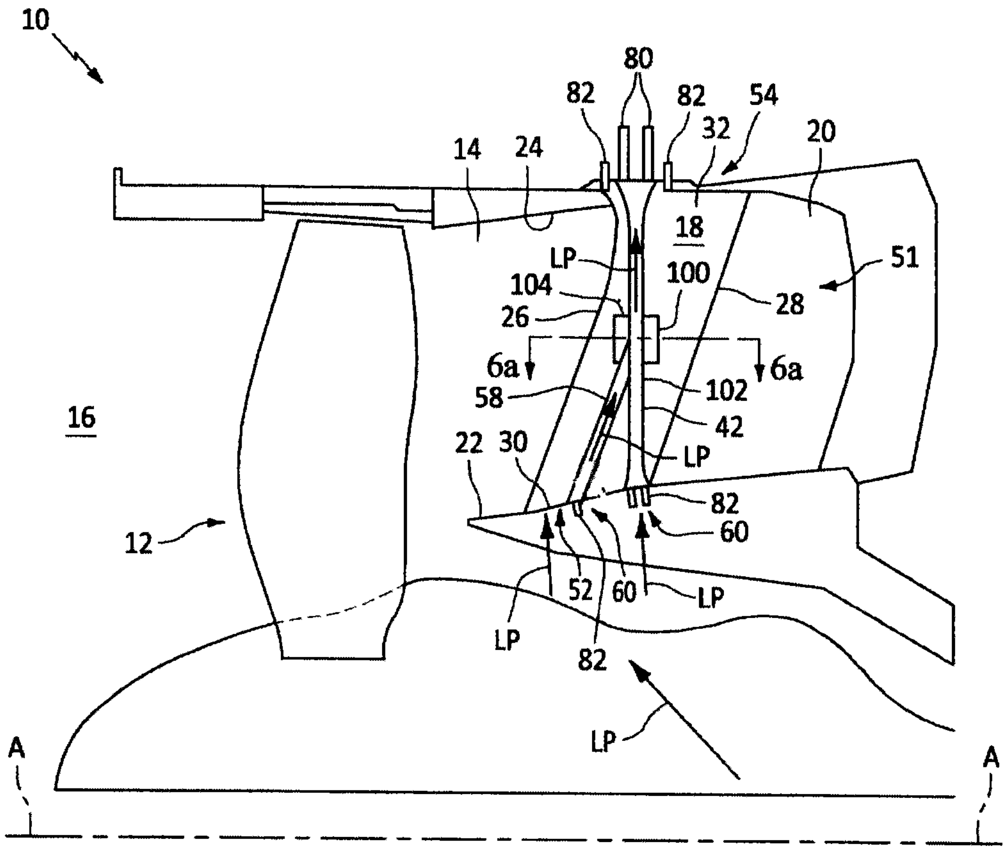
FIG. 6 is a schematic representation of an exemplary fan exit guide vane with load carrying member.
Figure 6A:
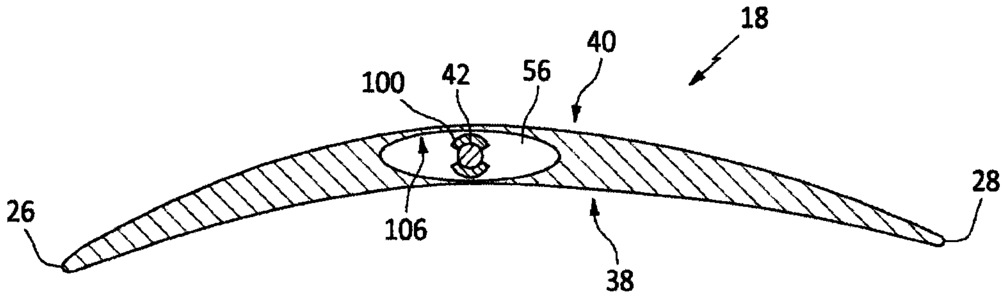
FIG. 6*a* is a sectional view schematic representation of the exemplary fan exit guide vane with load carrying member of FIG. 6.

Referring also to FIG. 6 and FIG. 6*a*, an exemplary fan exit guide vane 18 is also shown. The fan exit guide vane 18 shown in FIG. 6 has an angled vane configuration. The angled vane configuration 51 can be seen with the radially inner attachment region 30 connecting with the radially inner surface 22 at a first axial position 52 that is forward (upstream) of a second axial position 54. The radially outer attachment region 32 connects with the radially outer surface 24 at the second axial position 54 which is aft (downstream) of the location of the attachment between the radially inner attachment region 30 and radially inner surface 22.

The angled vane configuration 51 includes a modified load member cavity 56. The modified load member cavity 56 has a larger volume and wider cutout chordwise to allow for the load member 42 to maintain a relatively radial orientation relative to the gas turbine engine axis A. The load member 42 can carry a tension load across the fan duct 14 substantially radially aligned. In exemplary embodiments, the load member 42 can be oriented as angled from the radial orientation relative to axis A.

As seen in FIG. 6, there can be a modified load member 58 having additional hardware that provides additional attachment points 60 proximate the radially inner attachment region 30 and/or the radially outer attachment region. The embodiment at FIG. 6 shows two such points 60. The modified load member 58 can be utilized to accommodate more complex load carrying arrangements. The load member(s) 42, 58 are packaged within the aerodynamic shroud of the fan exist guide vane (FEGV) providing benefits over the use of fan frames.

Figure 7:
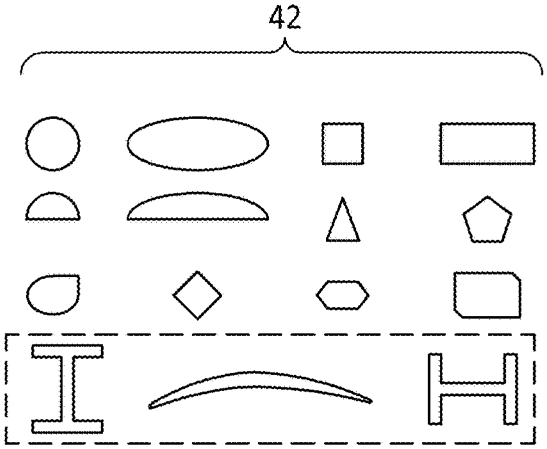
FIG. 7 is a schematic representation of exemplary cross-sections for the load carrying member.
Figures 8A, 8B, 8C, 8D:
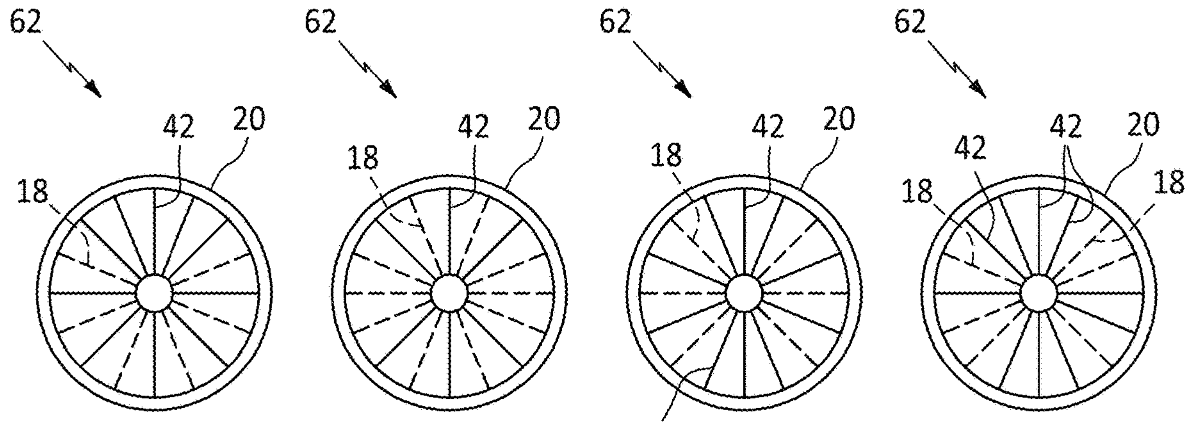
FIGS. 8*a* to 8*d* are aft looking forward view schematic representations of exemplary fan exit guide vane patterns with load carrying members.

Also referring to FIG. 7, the load member 42, 58 can be configured with a variety of cross-sectional shapes depending on the particular loads required. The cross-sectional shapes of the load member 42, 58 can include but are not limited to circular, oval, square, rectangular, semi-circle, semi-oval, triangular, pentagonal, polygonal, diamond, I-beam, crescent, H-beam and the like.

Referring also to FIGS. 8*a* to 8*d*, an array 62 of fan exit guide vanes 18 arranged circumferentially around the fan duct 20. The array 62 of fan exit guide vanes 18 can be arranged in a variety of configurations. Some of the fan exit guide vanes 18 can be conventional in the absence of a load member 42, while others can include a load member 42 within the fan exit guide vane 18. The array 62 can have symmetrically aligned circular pattern 64. For example, there can be a load member 42 within every other fan exit guide vane 18 around the array 62. For example, the fan exit guide vanes 18 that are at 12 o'clock, 3 o'clock, 6 o'clock and 9 o'clock can include a load member 42. For example, only the fan exit guide vanes 18 at 2 o'clock, 4 o'clock, 8 o'clock and 10 o'clock do not have a load member 42. Any variety of symmetrically aligned circular patterns 64 can be employed. The array 62 can include a non-symmetrically aligned pattern 66. For example, there can be fan exit guide vanes 18 with load members 42 included in positions relative to the clock face, that are non-symmetrical. For example, load members 42 included in locations at 10 o'clock, 11 o'clock, 12 o'clock, 1 o'clock, 5 o'clock, 6 o'clock and 7 o'clock. Any variety of non-symmetrically aligned patterns 66 can be employed.

Figure 9:
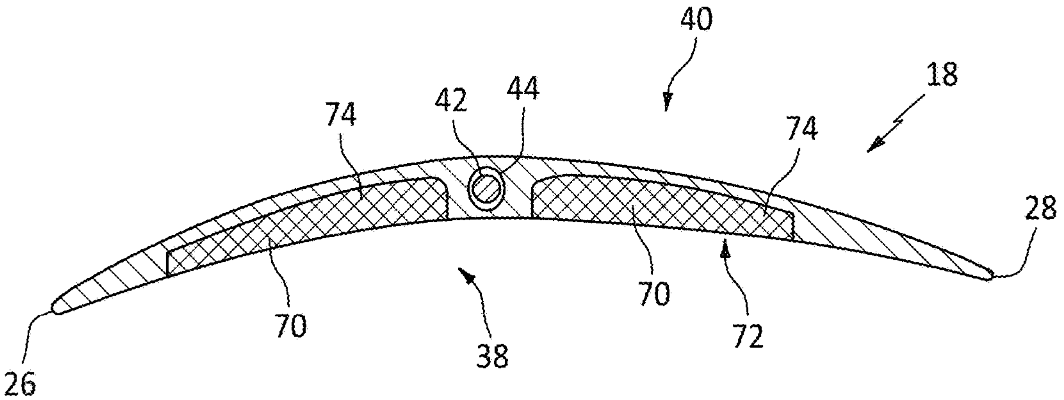
FIG. 9 is a cross-section schematic representation of exemplary fan exit guide vane with acoustic treatment.

Referring also to FIG. 9, an exemplary fan exit guide vane 18 with acoustic treatment 70 is shown. The fan exit guide vane 18 can include the addition of acoustic treatment 70 proximate the pressure side 38. The acoustic treatment 70 can be a material that dampens sound waves that contact the surface 72 of the acoustic treatment 70. The acoustic treatment 70 can be added to an acoustic treatment cavity 74 formed within the pressure side 38 between the leading edge 26 and trailing edge 28. The acoustic treatment cavity 74 can be a relatively large volume of the fan exit guide vane 18 because the load member 42 accounts for the structural tension load that would otherwise be required to be maintained by the material of the fan exit guide vane 18 removed to form the acoustic treatment cavity 74. A relatively larger volume of acoustic treatment material 70 can be mounted within the acoustic treatment cavity 74 as opposed to a fan exit guide vane 18 without the load member 42.

As seen in FIG. 5 and FIG. 6, the fan exit guide vane 18 and/or the load member 42 can be attached to fan duct 14 structural members 80 with fasteners 82 proximate the radially inner attachment region 30 as well as the radially outer attachment region 32. The fan exit guide vane 18 can be fixed or can be an adjustable fan exit guide vane 18 capable of rotating relative to fan exhaust flow 90 along the fan duct 14. The fan exit guide vane 18 can also be a split design that allows for rotation of the fan exit guide vane 18 at multiple locations along the span 34.

Referring to FIGS. 5, 5*a* and FIGS. 6, 6*a* a damper 100 is in operative communication with the load member 42. The damper 100 is configured to change the mode of excitement integral to the load member 42. The damper 100 can change the frequency and/or the amplitude of the vibration of the fan exit guide vane 18. The damper 100 can be formed integral with the load member 42. The damper 100 can be separate material added/attached to the load member 42. The damper 100 can be in operative communication at an individual location or along multiple locations along the length/span 102 of the load member 42. The damper 100 can contact the load member 42 at any portion along the load member 42 span 102 between the radially inner attachment region 30 and the radially outer attachment region 32. The damper 100 can be located proximate a load member central portion 104. Locating the damper 100 proximate the load member central portion 104 is considered beneficial to dampen, that is, shift the vibration of the load member 42. The damper 100 can be located along the span 102 farthest from the fixed ends of the load member 42. The damper 100 can fully encircle the load member 42 as shown at FIG. 5*a*. In an exemplary embodiment, the damper 100 can partially encircle the load member 42 as shown in FIG. 6*a*. It is contemplated that the damper 100 can be in contact with the load member 42 in a variety of locations as well as in contact with the inner surface 106 of the load member cavity 44, or modified load member cavity 56 depending on the design of the load member 42. In an exemplary embodiment damper 100 can be in contact with the fan exit guide vane 18 on only a side and contact the load member cavity 44 on only a side, such as only the suction side 40 or pressure side 38 or leading edge 26 or trailing edge 28 side and any combination. The damper 100 dampens the vibration of the fan exit guide vane 18 when the damper 100 contacts an area of the inner surface 106.

A technical advantage of the disclosed fan exit guide vane load carrying member with damper includes allowing for a dedicated tension load carrying element and damper to offload the forces that would typically react on the fan exit guide vane.

Another technical advantage of the disclosed fan exit guide vane load carrying member with damper includes allowing for additional space within the fan exit guide vane envelope to accommodate additional design features while dampening unwanted vibration.

Another technical advantage of the disclosed fan exit guide vane load carrying member with damper includes additional vibration dampening capacity.

Another technical advantage of the disclosed fan exit guide vane load carrying member damper includes decoupling the aerodynamic load capacity from the structural load capacity of the fan exit guide vane.

Another technical advantage of the disclosed fan exit guide vane load carrying member with damper includes the capacity to customize the load carrying arrangement around the array of fan exit guide vanes.

There has been provided a fan exit guide vane load carrying member with damper. While the fan exit guide vane load carrying member with damper has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A fan exit guide vane load member with a damper comprising:

a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane;

a load member cavity formed within the fan exit guide vane extending spanwise through the fan exit guide vane from the radially inner attachment region to the radially outer attachment region;

the load member extending through the load member cavity beyond each of the radially inner attachment region and the radially outer attachment region of the fan exit guide vane; and the damper formed integral as one unit with the load member, wherein integral is defined as a single, continuous material without joints, connections, or assembly of multiple components.

2. The fan exit guide vane load member with a damper according to claim 1, wherein the damper being configured to change the mode of excitement integral to the fan exit guide vane.

3. The fan exit guide vane load member with a damper according to claim 1, wherein the damper is located along any portion of the load member span between the radially inner attachment region and the radially outer attachment region.

4. The fan exit guide vane load member with a damper according to claim 1, wherein the damper is only located at a load member central portion, wherein the load member central portion is located midway between fixed ends of the load member, the damper located along the span farthest from the fixed ends of the load member beyond each of the radially inner attachment region and the radially outer attachment region of the fan exit guide vane.

5. The fan exit guide vane load member with a damper according to claim 1, wherein the damper contacts an inner surface of the load member cavity.

6. A gas turbine engine with a fan exit guide vane load member with a damper comprising:

a fan located within a fan duct;

an array of fan exit guide vanes supported within the fan duct downstream from the fan, the array of fan exit guide vanes span across the fan duct attached to a radially inner surface of the fan duct and a radially outer surface of the fan duct;

each of the fan exit guide vanes comprising a leading edge and a trailing edge opposite chordwise from the leading edge; a radially inner attachment region opposite spanwise from a radially outer attachment region, the radially inner attachment region in operative communication with the radially inner surface of the fan duct, the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane;

a load member cavity formed within at least one fan exit guide vane in the array, the load member cavity extending spanwise through the at least one fan exit guide vane from the radially inner attachment region to the radially outer attachment region;

the load member extending through the load member cavity beyond each of the radially inner attachment region and the radially outer attachment region of the at least one fan exit guide vane; the load member in operative communication with the radially inner surface and the radially outer surface; and the damper in operative communication with the load member, wherein the damper is only located at a load member central portion, wherein the load member central portion is located midway between fixed ends of the load member, the damper located along the span farthest from the fixed ends of the load member beyond each of the radially inner attachment region and the radially outer attachment region of the fan exit guide vane.

7. The gas turbine engine with the fan exit guide vane load member with the damper according to claim 6, wherein the damper contacts the load member on only a side and contacts the load member cavity on only a side.

8. The gas turbine engine with the fan exit guide vane load member with the damper according to claim 6, wherein the damper is located along a load member span at a predetermined distance farthest from with the radially inner surface and the radially outer surface.

9. The gas turbine engine with the fan exit guide vane load member with the damper according to claim 6, wherein the damper contacts an inner surface of the load member cavity.

10. A process for supporting a structural load path in a gas turbine engine with a fan exit guide vane having a load member with a damper comprising:

locating a fan within a fan duct;

supporting an array of fan exit guide vanes within the fan duct downstream from the fan;

attaching the array of fan exit guide vanes spanned across the fan duct to a radially inner surface of the fan duct and a radially outer surface of the fan duct;

each of the fan exit guide vanes comprising a leading edge and a trailing edge opposite chordwise from the leading edge; a radially inner attachment region opposite spanwise from a radially outer attachment region;

coupling the radially inner attachment region in operative communication with the radially inner surface of the fan duct;

coupling the radially outer attachment region in operative communication with the radially outer surface of the fan duct;

a span dimension extending between the radially inner attachment region and the radially outer attachment region;

a chord dimension extending between the leading edge and the trailing edge;

a pressure side opposite a suction side of the fan exit guide vane;

forming a load member cavity within at least one fan exit guide vane in the array;

extending the load member cavity spanwise through the at least one fan exit guide vane from the radially inner attachment region to the radially outer attachment region;

extending the load member through the load member cavity beyond each of the radially inner attachment region and the radially outer attachment region of the at least one fan exit guide vane;

coupling the load member in operative communication with the radially inner surface and the radially outer surface; and forming the damper integral as one unit with the load member, wherein integral is defined as a single, continuous material without joints, connections, or assembly of multiple components.

11. The process of claim 10, further comprising:

configuring the damper to change the mode of excitement integral to the fan exit guide vane.

12. The process of claim 10, further comprising:

locating the damper along any portion of a load member span between the radially inner attachment region and the radially outer attachment region.

13. The process of claim 10, further comprising:

contacting an inner surface of the load member cavity with the damper.

14. The process of claim 10, further comprising:

locating the damper only at a load member central portion, wherein the load member central portion is located midway between fixed ends of the load member, the damper located along the span farthest from fixed ends of the load member beyond each of the radially inner attachment region and the radially outer attachment region of the fan exit guide vane.

15. The process of claim 10, further comprising:

contacting the load member with the damper on at least one side; and contacting the load member cavity with the damper on at least one side.

* * * * *